US008047779B2

(12) United States Patent
Roy et al.

(10) Patent No.: US 8,047,779 B2
(45) Date of Patent: Nov. 1, 2011

(54) COMBINED AXIAL AND TRANSVERSE CONSTRAINT AND ALIGNMENT SYSTEM AND METHOD FOR ROTARY MACHINES

(75) Inventors: Kevin John Lewis Roy, Altamont, NY (US); Michael Thomas Hamlin, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 603 days.

(21) Appl. No.: 12/256,570

(22) Filed: Oct. 23, 2008

(65) Prior Publication Data

US 2010/0104431 A1 Apr. 29, 2010

(51) Int. Cl.
*F01D 25/28* (2006.01)
*F16M 1/04* (2006.01)

(52) U.S. Cl. .................................... 415/213.1; 248/672

(58) Field of Classification Search ............... 415/213.1, 415/214.1, 209.2; 29/889.2, 889.22
See application file for complete search history.

(56) References Cited

U.S. PATENT DOCUMENTS

| | | | | |
|---|---|---|---|---|
| 3,754,833 | A * | 8/1973 | Remberg | 415/108 |
| 3,892,500 | A * | 7/1975 | Miller et al. | 415/213.1 |
| 4,732,533 | A * | 3/1988 | Remberg et al. | 415/134 |
| 4,734,009 | A | 3/1988 | Campbell et al. | |
| 4,765,759 | A | 8/1988 | Le Breton et al. | |
| 5,108,258 | A * | 4/1992 | Gros | 415/213.1 |
| 5,411,365 | A | 5/1995 | Mazzola et al. | |
| 6,402,468 | B1 * | 6/2002 | Florin et al. | 415/214.1 |
| 6,793,458 | B2 * | 9/2004 | Kawai et al. | 415/213.1 |
| 6,821,083 | B2 * | 11/2004 | Lathrop et al. | 415/142 |
| 7,273,348 | B2 * | 9/2007 | Amirtharajah et al. | 415/214.1 |
| 7,421,783 | B2 * | 9/2008 | Namburi et al. | 29/889.2 |
| 7,520,721 | B2 * | 4/2009 | Hamlin et al. | 415/213.1 |
| 2007/0071600 | A1 * | 3/2007 | Amirtharajah et al. | 415/214.1 |
| 2008/0069691 | A1 * | 3/2008 | Hamlin et al. | 415/214.1 |

* cited by examiner

*Primary Examiner* — Benjamin Sandvik
*Assistant Examiner* — Joseph Schoenholtz
(74) *Attorney, Agent, or Firm* — Nixon & Vanderhye P.C.

(57) ABSTRACT

A system for aligning a shell of a rotary machine with a standard along an axial centerline and a transverse centerline of the rotary machine includes a pair of generally L-shaped hooks on the shell; a generally T-shaped member comprising a base, a post, and a cross member provided to the standard; a pair of axial gib keys provided on opposing sides of the cross member, at least one of the axial gib keys configured to engage at least one of the L-shaped hooks and the other being configured to engage the shell; and a pair of transverse gib keys provided on opposing sides of the post, each transverse gib key configured to engage a respective L-shaped hook.

17 Claims, 2 Drawing Sheets

COMBINED AXIAL AND TRANSVERSE CONSTRAINT AND ALIGNMENT SYSTEM AND METHOD FOR ROTARY MACHINES

This invention relates generally to rotary machines and, more particularly, to a method and a system for aligning a shell of the rotary machine with a standard, or pedestal, of the rotary machine.

BACKGROUND OF THE INVENTION

The high pressure section of a turbine may require maintenance, including replacement of certain parts. For example, a shell may require replacement and be required to interface with the existing standards, or pedestals, of the turbine. The existing standards may have different provisions for axial and transverse constraint of the turbine shell and they may be undersized and not capable of carrying the operating loads of the unit when the turbine shell is replaced.

Current designs for replacing the turbine shell have worked for decades, and provide axial and transverse constraint on the turbine. One known design uses a fabricated I-beam. The flanges of the fabricated I-beam are bolted to both the standard and the shell to provide the axial and transverse support. However, the I-beams are hard to assemble, service, and are prone to failures of the weld between the flange and web on the I-beam.

BRIEF DESCRIPTION OF THE INVENTION

According to one embodiment of the invention, a system for aligning a shell of a rotary machine with a standard along an axial centerline and a transverse centerline of the rotary machine comprises a pair of generally L-shaped hooks on the shell; a generally T-shaped member comprising a base, a post, and a cross member; a pair of axial gib keys provided on opposing sides of the cross member, at least one of the axial gib keys configured to engage at least one of the L-shaped hooks and the other being configured to engage the shell; and a pair of transverse gib keys provided on opposing sides of the post, each transverse gib key configured to engage a respective L-shaped hook.

According to another embodiment of the invention, a method of constraining and aligning a shell of a rotary machine with a standard along an axial centerline and a transverse centerline of the rotary machine comprises fastening at least one axial gib key to a generally T-shaped member provided to the standard so that the at least one axial gib key is in contact with at least one L-shaped hook of a pair of generally L-shaped hooks of the shell; fastening a second axial gib key to the T-shaped member so that the second axial gib key is in contact with the shell; and fastening a pair of transverse gib keys to opposing sides of the T-shaped member so that each transverse gib key is in contact with a respective L-shaped hook.

DETAILED DESCRIPTION OF THE INVENTION

Figure 1:
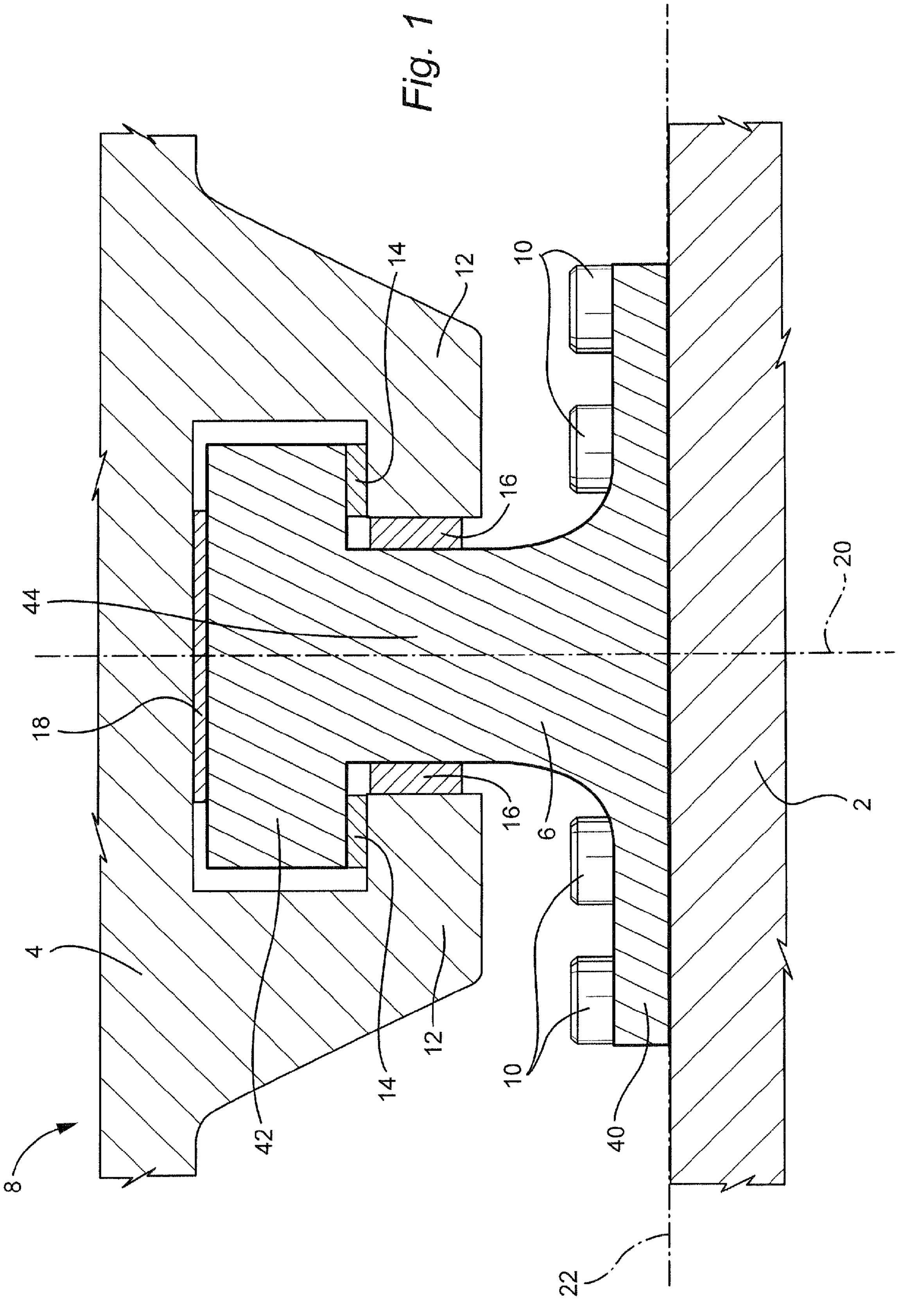
FIG. 1 schematically depicts a steam turbine, including a standard and a shell connection according to an embodiment.

Referring to FIG. 1, a rotary machine, e.g. a turbine, 8 comprises a standard, or pedestal, 2 and an outer shell 4. The standard 2 may be, for example, a front or mid standard, or a governor/generator end/thrust bearing pedestal. A generally T-shaped member 6, or "fixator," is secured to the standard 2 by fasteners 10, which may be, for example, threaded fasteners such as bolts. The fasteners 10 secure a base 40 of the T-shaped member 6 to the standard 2.

The shell 4 comprises a pair of generally L-shaped hooks 12 that are configured to interface with a cross member 42 of the T-shaped member 6. Although the L-shaped hooks 12 are shown as integrally formed with the shell 4, it should be appreciated that the L-shaped hooks 12 may be formed separately and fastened to the shell 4. The cross member 42 of the T-shaped member 6 is connected to the base 40 by a post 44. A groove 24 may be provided at the junction of the cross member 42 and the post 44 of the T-shaped member 6. It should also be appreciated that the T-shaped member may be formed integrally, e.g. as a one-piece construction, with the standard.

A pair of first axial gib keys 14 and a second axial gib key 18 are configured to constrain the shell 4 with respect to an axial centerline 20. The first axial gib keys 14 may also be referred to as pull gib keys and the second axial gib key 18 may be referred to as a push gib key. A pair of transverse gib keys 16 are configured to constrain the shell 4 with respect to a transverse centerline 22 of the turbine 8. Each gib key 14, 16, 18 may be a gib key as disclosed, for example, in U.S. Pat. No. 7,273,348.

Figure 2:
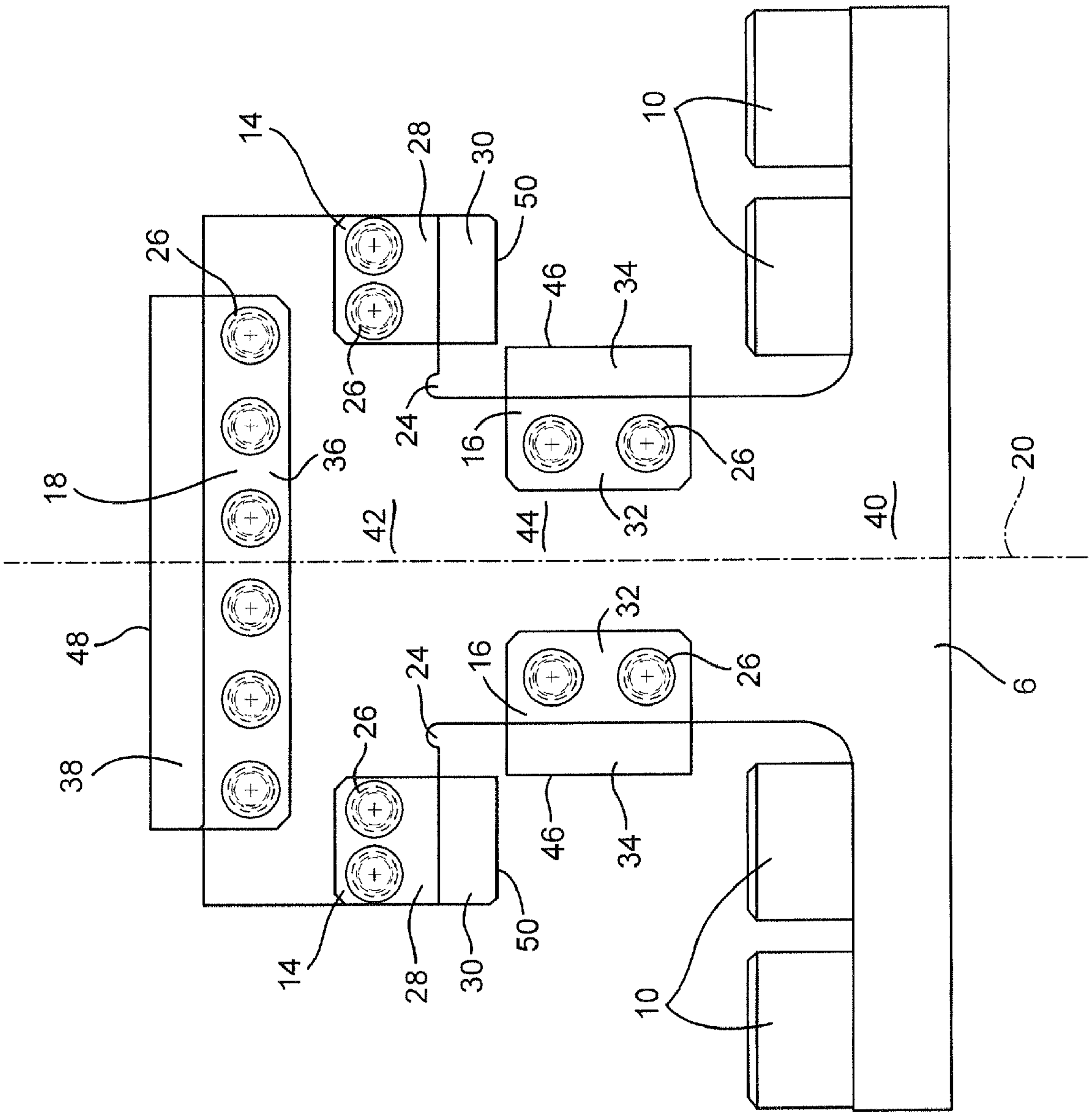
FIG. 2 schematically depicts the T-shaped member and gib keys of FIG. 1.

Referring to FIG. 2, the pull keys 14 each comprise a first plate 28 and a second plate 30. The first plate 28 is secured to the top 42 of the T-shaped member 6 by fasteners 26, for example threaded fasteners, such as bolts. The second plates 30 of the pull keys 14 comprise contact faces 50 that are configured to contact the L-shaped hooks 12 of the shell 4. The contact faces 50 may be provided with a coating. For example, a coating may be applied to the contact faces 50 to harden the contact faces 50.

The push gib key 18 comprises a first plate 36 and a second plate 38. The first plate 36 is secured to the cross member 42 by fasteners 26. The second plate 38 of the second axial gib key 18 comprises a contact face 48 that is configured to contact the shell 4. The contact face 48 may also comprise a coating as discussed with respect to the contact faces 50 of the pull gib keys 14. The axial keys 14, 18 may be fastened to either the T-shaped member 6, or the shell 4.

The shell 4 is axially constrained and aligned with the standard 2 along the axial centerline 20 between the first axial gib keys 14 and the second axial gib key 18.

Referring again to FIG. 2, each transverse gib key 16 comprises a first plate 32 and a second plate 34. The first plate 32 is connected to the post 44 of the T-shaped member 6 by fasteners 26. Each second plate 34 comprises a contact face 46 that is configured to contact an L-shaped hook 12 of the outer shell 4. Each contact face 46 may be provided with a coating as previously described. The transverse keys 16 may be fastened to either the T-shaped member 6, or the shell 4.

The shell 4 is transversely constrained and aligned with the standard 2 along the transverse centerline 22 between the transverse keys 16.

The combined axial and transverse constraint and alignment system described herein can handle the operating loads of rotary machine, for example a steam or gas turbine, while conforming to current design limits and best practices. The combined axial and transverse constraint and alignment system also provide a design option if design space limits use of current fixation methods. It may be used on retrofits to turbines.

The combined axial and transverse constraint system is also capable of supporting the high loads caused by piping, steam torque, and seismic events. The system is configured to reside in an environment with thermal gradients and little maintenance room. The system is easily adjustable for alignment of the unit, accessible for maintenance, and is capable of long operation without repair.

The gib keys and the T-shaped member may be produced from high grade material, which will handle the forces from both operation and seismic events while maintaining acceptable material stresses. The gib keys and T-shaped member do not contain any welds, which are more prone to failure due to the thermal gradients from the shell to the standard. The gib keys allow easy alignment/adjustment of the unit without the need to take apart the whole assembly.

The combined axial and transverse constraint and alignment system disclosed herein provides a more robust design compared to existing I-beam designs currently in use.

The system may also be used on inner shells if design space required deviation from current standard practices.

Unlike some current designs, which only provided one degree of fixation (i.e. vertical, transverse, or axial), the system disclosed herein provides two degrees of fixation, transverse and axial, from a single component.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for aligning a shell of a rotary machine with a standard along an axial centerline and a transverse centerline of the rotary machine, the system comprising:
- a pair of generally L-shaped hooks on the shell;
- a generally T-shaped member comprising a base, a post, and a cross member provided on the standard;
- a pair of axial gib keys provided on opposing sides of the cross member, at least one of the axial gib keys configured to engage at least one of the L-shaped hooks and the other being configured to engage the shell; and
- a pair of transverse gib keys provided on opposing sides of the post, each transverse gib key configured to engage a respective L-shaped hook.

2. A system according to claim 1, wherein the at least one axial gib key configured to engage the at least one L-shaped hook comprises a pair of axial gib keys, the pair of axial gib keys being provided on opposite sides of the post.

3. A system according to claim 1, wherein each axial gib key comprises a first plate configured to fastened to the cross member and a second plate having a contact face configured to engage either the L-shaped hook or the shell.

4. A system according to claim 3, wherein at least one contact face of the second plates comprises a coating.

5. A system according to claim 1, wherein each transverse gib key comprises a first plate configured to be fastened to the post and a second plate comprising a contact face configured to engage a respective L-shaped hook.

6. A system according to claim 5, wherein at least one contact face comprises a coating.

7. A system according to claim 1, wherein the base of the T-shaped member is fastened to the standard.

8. A system according to claim 7, wherein the base is fastened to the standard by fasteners.

9. A system according to claim 1, wherein the L-shaped hooks are integrally formed with the shell.

10. A system according to claim 1, wherein the rotary machine is a turbine.

11. A method of constraining and aligning a shell of a rotary machine with a standard along an axial centerline and a transverse centerline of the rotary machine, the method comprising:
- fastening at least one axial gib key to a generally T-shaped member provided to the standard so that the at least one axial gib key is in contact with at least one generally L-shaped hook of a pair of L-shaped hooks of the shell;
- fastening a second axial gib key to the T-shaped member so that the second axial gib key is in contact with the shell; and
- fastening a pair of transverse gib keys to opposing sides of the T-shaped member so that each transverse gib key is in contact with a respective L-shaped hook.

12. A method according to claim 11, wherein the at least one axial gib key comprises a pair of axial gib keys, the pair of axial gib keys being provided on opposing sides of the T-shaped member.

13. A method according to claim 11, wherein each axial gib key and each transverse gib key comprises a first plate connected to the T-shaped member and a second plate comprising a contact face.

14. A method according to claim 13, wherein at least one contact face comprises a coating.

15. A method according to claim 11, wherein the T-shaped member is fastened to the standard.

16. A method according to claim 11, wherein the L-shaped hooks are integrally formed with the shell.

17. A method according to claim 11, wherein the rotary machine is a turbine.

* * * * *